United States Patent [19]

Wada et al.

[11] Patent Number: 4,773,062

[45] Date of Patent: Sep. 20, 1988

[54] OPTICAL INFORMATION RECORDING AND REPRODUCING APPARATUS INCLUDING LENS SUPPORTING MECHANISM EMPLOYING CANTILEVER SPRINGS

[75] Inventors: Yasumitsu Wada; Seiichi Makimoto; Akihiro Ogata, all of Saitama, Japan

[73] Assignee: Pioneer Electronic Corporation, Tokyo, Japan

[21] Appl. No.: 901,498

[22] Filed: Aug. 28, 1986

[30] Foreign Application Priority Data

Aug. 30, 1985 [JP] Japan .......................... 60-133663[U]

[51] Int. Cl.⁴ .............................................. G11B 7/00
[52] U.S. Cl. ........................................ 369/44; 369/45
[58] Field of Search ................. 250/201 DF; 358/342; 369/43, 44, 45, 46

[56] References Cited

U.S. PATENT DOCUMENTS 4,613,202  9/1986  Kuriyama .......................... 369/44 X
4,669,823  6/1987  Iguma et al. ....................... 369/44 X Primary Examiner—Robert L. Richardson
Attorney, Agent, or Firm—Sughrue, Mion, Zinn, Macpeak & Seas

[57] ABSTRACT

A pickup system for an optical information recording and/or reproducing apparatus includes a support device for the lens element including pairs of cantilevel-like springs separately disposed in first and second perpendicular directions for flexing in respectively orthogonal directions.

8 Claims, 4 Drawing Sheets

OPTICAL INFORMATION RECORDING AND REPRODUCING APPARATUS INCLUDING LENS SUPPORTING MECHANISM EMPLOYING CANTILEVER SPRINGS

BACKGROUND OF THE INVENTION

1. Field of the Invention

The present invention relates to a pickup system in an optical information recording and reproducing apparatus.

2. Background Art

Generally, when a disk is used as a information recording medium, such as a video disk, a digital audio disk, or the like, recording information signals are recorded by forming fine pits or grooves in spiral tracks on the disk surface. In the case where the thus recorded information signals are read, the tracks are irradiated with a spot of light and the changes of reflected light owing to the presence or absence of the pits are converted into electrical signals to thereby reproduce the original information signals from the electrical signals.

This reproduction requires that the light spot be exactly focused on the recording surface of the disk. Accordingly, it is necessary to perform position control (focusing servo) for an objective lens in the direction of the optical axis of the objective lens in order to focus the light spot on the recording surface. Furthermore, this reproduction requires the light spot to exactly track the recording tracks. Accordingly it is necessary to perform position control (tracking servo) for the light spot in the direction of the radius of the disk.

FIG. 1 shows an example of a previously developed pickup system.

Referring to FIG. 1, an objective lens 1 is fixedly fitted into the upper end portion of a cylindrical holder 2 and supported by a supporting mechanism 3 including the holder 2 so as to be movable in the direction of the optical axis of the objective lens, that is, the focusing direction Z, as well as in the direction perpendicular to the focusing direction, that is, the tracking direction X.

The supporting mechanism 3 is constituted by a pair of flexible springs 7, a plate-like junction member 8, and another pair of flexible springs 9. The pair of horizontally flexing springs 7 are disposed separately from each other in the tracking direction X and fixed in their portions at one end to a base 5 through brackets 4. That is, the springs 7 form cantilevers so as to be flexible in the tracking direction X. The plate-like junction member 8 is disposed between and connected at side end portions opposite to the respective free end portions of the horizontally flexing springs 7. The pair of vertically flexing springs 9 are fixed respectively at one end to the upper and lower end portions of the junction member 8 and extend to the respective fixed end side portions of the pair of horizontally flexing springs 7 so as to be connected at their other end portions, that is, their free end portions, to the outer periphery of the holder 2. The springs 9 are made flexible only in the focusing direction Z.

A round bobbin 10 is formed at the lower end portion of the holder 2 coaxially with the holder 2. A coil 11 which is wound on the outer periphery of the bobbin 10 drives the lens in the focusing direction. A pair of cylindrical bobbins 12 are provided at a center portion of the holder 2 so as to project oppositely in the tracking direction X. A coil 13 for driving the lens 1 in the tracking direction X is wound on each of the bobbins 13. The bobbin 10, and hence the coil 11, is disposed in a circular magnetic gap 16 formed in a magnetic circuit 15 fixed to the base 5. The other coils 13 are arranged so as to sandwich the holder 2 and so as to be disposed respectively in magnetic gaps 18 of a pair of magnetic circuits 17 fixed to the base 5.

Thus, the driving means for driving the objective lens 1 both in the focusing direction Z as well as in the tracking direction X is constituted by the large bobbin 10, the pair of cylindrical bobbins 12, the coil 11, the pair of coils 13, the magnetic circuit 15, the pair of magnetic circuits 17, and associated circuitry.

In the above-mentioned pickup system, the coils 11 and 13, and the magnetic circuits 15 and 17 are in the form of a stack in the focusing direction Z. Therefore, the pickup system is large in size in the focusing direction Z, causing a problem in making a compact and thin disk player. The size of the disk player is particularly important in keeping an optical information recording and reproducing apparatus compact.

SUMMARY OF THE INVENTION

It is therefore an object of the present invention to eliminate the disadvantage in the prior art pickup system.

It is another object of the present invention to provide a pickup system which enables the optical information recording and reproducing apparatus as a whole to be made compact, and especially thin.

The pickup system according to the present invention includes an objective lens for irradiating a recording surface of a recording medium with a spotlight. A supporting mechanism includes a holder for carrying the objective lens to thereby support the objective lens so that the objective lens is movable in a first direction of an optical axis of the objective lens as well as in a second direction perpendicular to the first direction. The holder further aligns the optical axis of the objective lens so as to be substantially perpendicular to the recording surface. Driving means drive the objective lens. The supporting mechanism includes at least a first pair of flexible cantilever-like springs separately disposed in one of the first and second directions, and which flex in the one direction. At least a second pair of flexible springs are separately disposed in the other one of the first and second directions, and flex in the other direction. The second pair of springs have their one ends supporting the holder and their other ends connected through a junction member to the first springs at respective free ends of the first springs. The driving means includes a first coil wound so as to have a center axis substantially parallel to the first direction, a second coil wound so as to have a center axis substantially perpendicular to the first direction, and magnetic circuits for generating magnetic flux interlinking with the first and second coils. The first and second springs extend substantially perpendicularly to a plane including the first and second directions and are arranged such that one half of the number of each of the first and second springs members are separated from the other half by a predetermined distance in the second direction. The first and second coils and the magnetic circuits are arranged such that one of the first and second coils is disposed within a range of an outer dimension of the other one of the first and second coils. The first and second coils and the magnetic circuits are interposed between the one and the other halves of the first and second springs.

The foregoing and other objects of the present invention will become apparent from the following description of the preferred embodiment taken in conjunction with the accompanying drawings.

DESCRIPTION OF THE PREFERRED EMBODIMENTS

Figure 1:
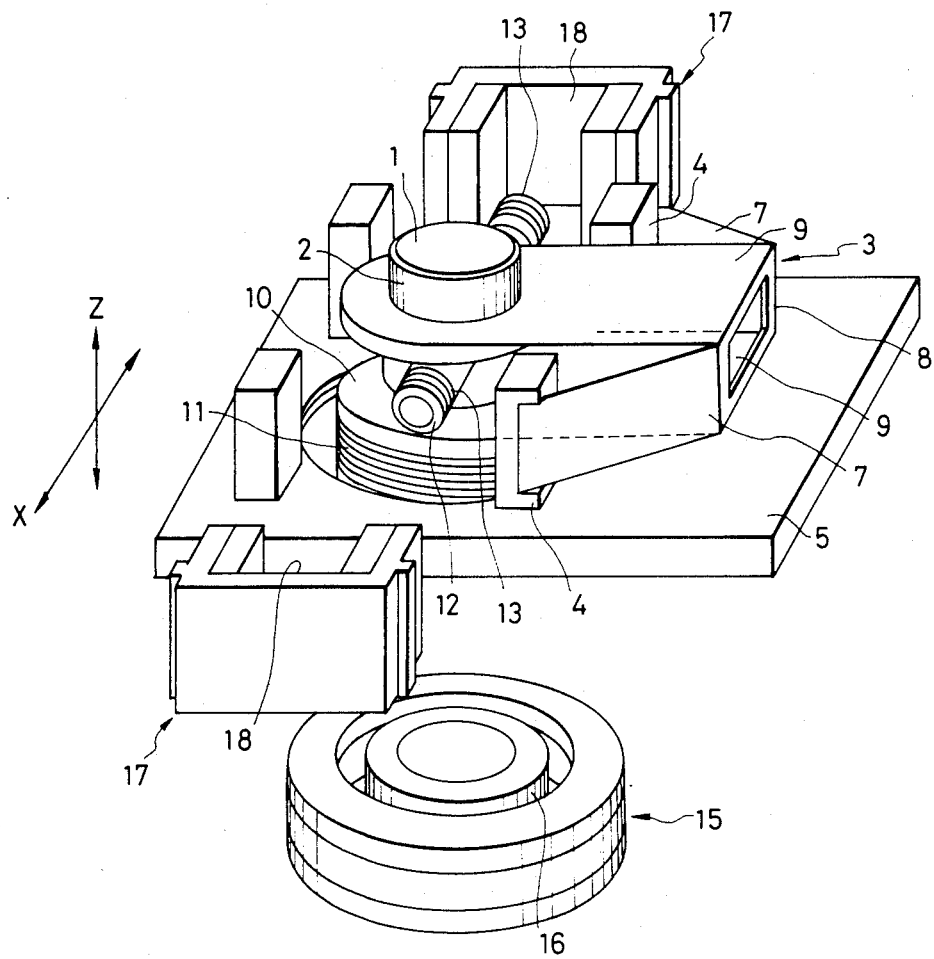
FIG. 1 is a view explaining a pickup system which has been previously developed.

Referring to the drawings, embodiments of the pickup system according to the present invention will be described hereunder.

Figure 2:
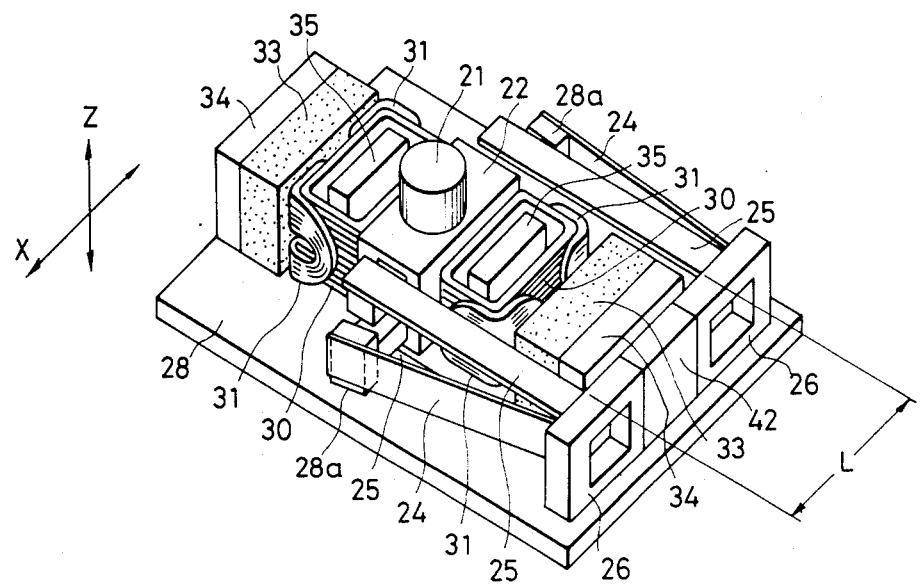
FIG. 2 is a perspective view of a main part of the pickup system according to the present invention.

As shown in FIG. 2, the objective lens 21 is inserted into a holder 22 formed like a rectangular parallelepiped. The holder 22 is attached to a base member 28, as shown in FIG. 2 through six leaf springs, that is, two horizontally flexing leaf springs 24 and four vertically flexing leaf springs 25, and a pair of junction members 26 interposed between the leaf springs 24 and 25. The objective lens 20 has the function of converging the light emitted from the laser diode (not shown) into a fine light spot on the recording surface of the information recording disk (not shown) which is a recording medium.

Of the six leaf springs 24 and 25, the two horizontally flexing springs 24 are arranged so as to extend substantially perpendicularly toward a plane containing a focusing direction Z along the optical axis of the objective lens 20 and a tracking direction X perpendicular to the focusing direction Z. The horizontally flexing springs 24 are separated from each other in the tracking direction X. These leaf springs 24 are attached to supporting projections 28a of the base member 28 in the form of cantilevers so as to be flexible in the (horizontal) tracking direction X. The four vertically flexing leaf springs 25 are arranged so as to extend substantially in parallel to the leaf springs 24, and so as to be separated in pairs in the focusing direction Z. Portions at one end of the four vertically flexing leaf springs 25 are connected to free end portions of the two horizontally flexing leaf springs 24 through the junction members 24. The four leaf springs 25 are flexible in the (vertical) focusing direction Z and support the holder 22 at their other end portions. As is particularly apparent in FIG. 3, the holder 22 is provided with two pairs of projections 22a extending oppositely in the tracking direction X and the other end portions of the four vertically flexing leaf springs 25 are connected to the projections 22a.

The holder 22, the leaf springs 24 and 25, the junction members 26, and the base member 28 make up a supporting mechanism which supports the objective lens 20 to make the objective lens movable both in the focusing direction Z and in the tracking direction X. The arrangement also aligns the optical axis of the objective lens to be perpendicular (along the Z direction) to the recording surface of the information recording disk (as described above).

As shown in FIG. 2, the holder 22 is formed like a rectangular parallelepiped and has six surfaces. A pair of rectangular-tubularly wound coils 30 are mounted next to the two of the surfaces parallel to a plane which contains the focusing direction Z and the tracking direction X so as to make the respective center axes of the coils 30 parallel to the focusing direction Z. A pair of coils 31 are fixed onto each of the opposite outer surfaces of the coils 30 so as to make each of the center axes of the four coils 31 perpendicular to the focusing direction Z. The four coils 31 are disposed within a range of the outer dimension of the coils 30 in the focusing direction Z.

Two magnetic circuits, each constituted by a magnet 33, a yoke 34 and a yoke plate 35, are provided on the base member 28 to generate magnetic flux which interlinks with the coils 30 and 31. The respective yoke 34 and the yoke plate 35 are formed integrally with the base member 28. The respective yoke plates 35 are inserted into corresponding ones of the rectangularly wound coils 30.

Driving means for driving the objective lens 21 is constituted by the coils 30, the coils 31 and the magnetic circuits.

As shown in FIG. 2, the six leaf springs 24 and 25 are arranged so that half, that is, three, of the six leaf springs 24 and 25 are separated from the remaining half by a distance L in the tracking direction X. The coils 30 and 31, and the magnetic circuits are disposed so as to be sandwiched by the separately disposed respective halves of the six leaf springs 24 and 25.

In the foregoing pickup system, upon application of a current to the coils 30 and 31, driving force is generated so that the leaf springs 24 and 25 are properly bent to thereby cause the objective lens 21 to move in the tracking direction X or in the focusing direction Z.

Figure 3:
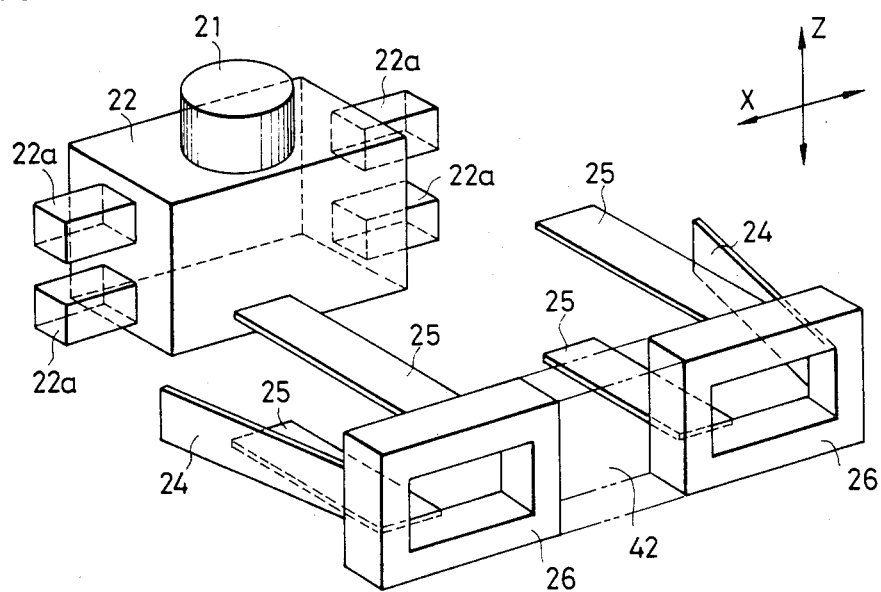
FIG. 3 is a detailed view of a part of the pickup system of FIG. 2.
Figure 4:
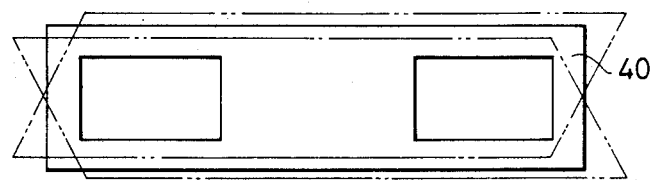
FIGS. 4 through 9 are views explaining modifications of the pickup system of FIG. 2.
Figure 5:
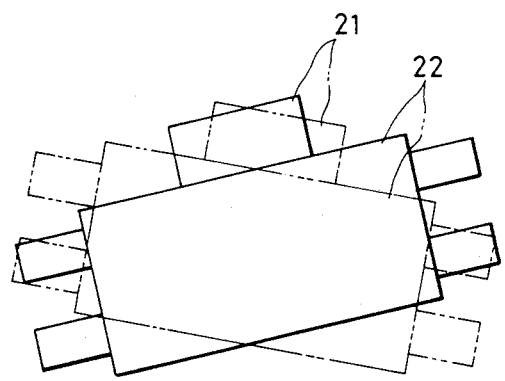

Further, in the foregoing pickup system, a pair of the junction members 26 are provided so as to correspond to the two halves of the leaf springs 24 and 25. Alternatively, however, it is possible to use a single junction member 40 which may be considered as if the foregoing pair of junction members 26 are integrated with each other as shown in FIG. 4. In this case, however, when the driving frequency of the objective lens 21 reaches a predetermined value or even close to it, the junction member 40 resonates in an oscillation mode that may transform the rectangular junction member into a parallelogram as shown in FIG. 3. Therefore, the objective lens 21 and the holder 22 may undesirably rotate as shown in FIG. 5 within an angular range including the focusing direction Z and the tracking direction X in addition to the originally designated focusing and tracking directions Z and X of the objective lens 21 and the holder 22. As a result, it becomes impossible to smoothly perform a focusing servo operation or a tracking servo operation.

In the foregoing embodiment of the pickup system, the pair of small junction members 26 are provided, so that the resonance frequency is made low. Accordingly, the pickup system is operated in a frequency band in which the loop gain is large, so that servo control can be performed smoothly.

In the above-mentioned pickup system, a damping or vibration absorbing member 42 made of rubber or the like is interposed between the pair of junction members 26, so as to increase the vibration-proof effect.

Figure 7:
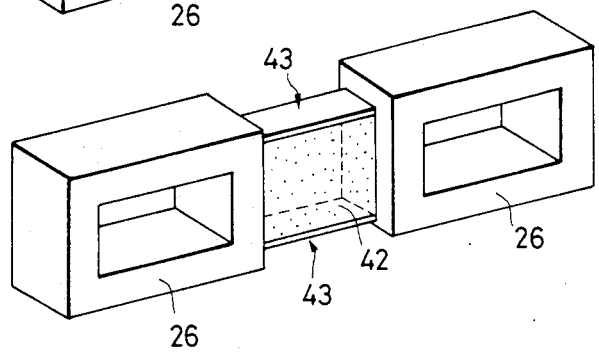
Figure 8:
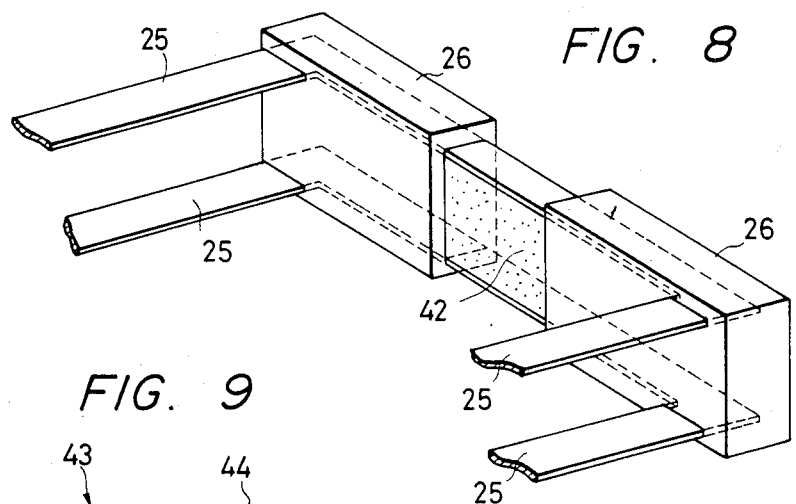
Figure 9:
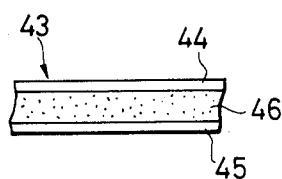

FIGS. 7 through 9 show modifications of the junction members 26.

Figure 6:
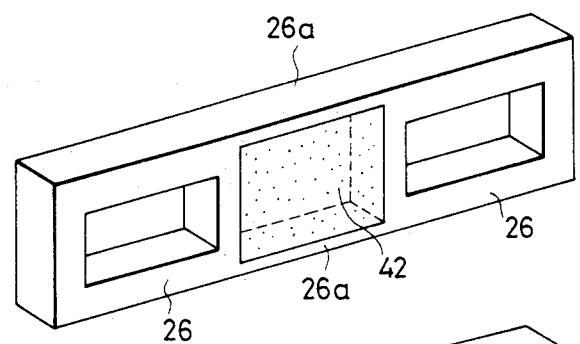

FIG. 6 shows a case in which a pair of junction members 26 are integrally formed with each other through thin connecting portions 26a. The space defined by the junction members 26 and the thin connecting portions 26a is filled with a vibration-absorbing material 42.

In FIG. 7, the pair of junction members 26 are connected through a pair of thin plates 43 each having a sandwich structure as shown in FIG. 9. The space defined by the junction members 26 and the thin plates 43 is filled with a vibration-absorbing material 42. In FIG. 9, thin plates 44 and 45 are made of metal, resin, or the like, of the same or different kind, and sandwich a thin film-like vibration-absorbing material 46.

In FIG. 8, each of two pairs of the four leaf springs 25 are integrated together at their one ends through one of a pair of junction members 26 connecting the leaf springs 25. This structure makes the leaf springs 25 themselves form a sandwich structure with the vibration-absorbing material 42.

The same vibration-proofing effect as that obtained by using the junction member as shown in FIGS. 2 and 3 can be obtained even in the case where such a junction member as shown in FIGS. 6 through 9 is employed. As described above in detail, the pickup system according to the present invention comprises an objective lens (21) for irradiating a recording surface of a recording medium with a light spot, a supporting mechanism including a holder for carrying the objective lens to thereby support the objective lens so that the objective lens is movable in a first direction of an optical axis of the objective lens as well as in a second direction perpendicular to the optical axis. Furthermore, the holder aligns the optical axis of the objective lens so as to be substantially perpendicular to the recording surface. Driving means drive the objective lens. The supporting mechanism includes at least a first pair of flexible cantilever-like members (leaf springs 24) separately disposed in one of the first and second directions, which are flexible in the one direction; and at least a second pair of flexible members (leaf springs 25) separately disposed in the other one of the first and second directions and which are flexible in the other direction. The second pair of flexible members have their one ends supporting the holder and their other ends connected to the first flexible members at respective free ends of the first flexible member through at least a junction member (26). The driving means includes a first coil (30) wound so as to have a center axis substantially parallel to the first direction, a second coil (31) wound so as to have a center axis substantially perpendicular to the first direction and magnetic circuits for generating magnetic flux interlinking with the first and second coils. The first and second flexible members extend substantially perpendicularly to a plane including the first and second directions and are arranged such that one half of the number of both the first and second flexible members are separated from the other half by a predetermined distance in the second direction. The first and second coils and the magnetic circuits are arranged such that one of the first and second coils is disposed within a range of an outer dimension of the other one of the first and second coils. The first and second coils and the magnetic circuits are interposed between the one and the other halves of the first and second flexible members.

That is, the first and second coils and the magnetic circuits are not stacked in the direction of the optical axis of the objective lens but are arranged side by side in a phantom plane perpendicular to the direction of the optical axis. Further, the first and second flexible members are divided into one and the other halves so that the one and the other halves of the flexible members are arranged so as to extend in the abovementioned phantom plane and so as to sandwich the first and second coils and the magnetic circuits. Accordingly, compared with the previously developed pickup system in which the coils and the magnetic circuits are arranged so as to be stacked in the direction of the optical axis of the objective lens, the pickup system according to the present invention is small in size in the direction of the optical axis of the objective lens. As a result, the optical information recording and reproducing apparatus of the pickup system can be made thin.

What is claimed is:

1. In an optical information recording or reproducing apparatus, a pickup system comprising:

an objective lens for irradiating a recording surface of a recording medium with a light spot:

a supporting mechanism including a holder for carrying said objective lens to movably support said objective lens in a first direction of an optical axis of said objective lens and in a second direction perpendicular to said first direction, and to align said optical axis of said objective lens so as to be substantially perpendicular to said recording surface;

driving means for driving said objective lens in said first direction and said second direction;

wherein said supporting mechanism includes:
   (a) at least one junction member;
   (b) at least a first pair of flexible cantilever-like members separately disposed in one of said first and second directions, and being made flexible in said one direction; and
   (c) at least a second pair of flexible members separately disposed in the other one of said first and second directions, and being made flexible in said other direction, said second pair of flexible members having their one ends supporting said holder and their other ends connected to said first flexible members at respective free ends thereof through said at least one junction member;

wherein said driving means includes:
   (a) a first coil wound so as to have a center axis substantially parallel to said first direction;
   (b) a second coil wound so as to have a center axis substantially perpendicular to said first direction; and
   (c) magnetic circuits for generating magnetic flux interlinking with said first and second coils;

wherein said first and second flexible members extend substantially perpendicularly to a plane including said first and second directions and are arranged such that one half of both of said first and second flexible members are separated from the other half thereof by a predetermined distance in said second direction:

said first and second coils and said magnetic circuits being arranged such that one of said first and second coils is disposed within a range of an outer dimension of the other one of said first and second coils, and said first and second coils and said magnetic circuits are interposed in said second direction between said one and said other halves of said first and second flexible members.

2. A pickup system as recited in claim 1, further comprising a base whereat ends opposite said free ends of said first flexible members are rigidly attached, said magnetic circuits being rigidly attached to said base and said first and second coils being rigidly attached to said objective lens.

3. A pickup system as recited in claim 1, wherein said at least one junction member comprises two junction members, each junction member connecting respective ones of said two halves of said flexible members.

4. A pickup system as recited in claim 3, further comprising a vibration-absorbing material interposed between said two junction members.

5. A pickup system as recited in claim 4, wherein at least one of said flexible members of said first half is integral with a corresponding one of said flexible members of said second half.

6. A pickup system as recited in claim 4, wherein said first pair of flexible members are disposed in said second direction and said second pair of flexible members are disposed in said first direction.

7. A pickup system as recited in claim 6, wherein said at least one first pair of flexible members consist of two first pairs of flexible members.

8. A pickup system as recited in claim 7:
wherein said at least one junction member consists of two junction members; and
wherein each of said flexible members of said first half and of said first pairs is integrally connected through a connecting portion to a corresponding flexible member of said second half and of said first pairs; and
further comprising a vibration-absorbing material interposed between said junction members and said connecting portions.

* * * * *